Aug. 18, 1964  J. A. PARDINI ET AL  3,145,333
FORCE LIMITING DEVICE FOR MOTOR CONTROL
Filed Oct. 29, 1962  3 Sheets-Sheet 1

INVENTORS
John A. Pardini
Victor Hutter
BY
Roland G. Anderson
Attorney

Aug. 18, 1964  J. A. PARDINI ET AL  3,145,333
FORCE LIMITING DEVICE FOR MOTOR CONTROL
Filed Oct. 29, 1962  3 Sheets-Sheet 2

INVENTORS
John A. Pardini
Victor Hutter
BY
Roland A. Anderson
Attorney

Aug. 18, 1964   J. A. PARDINI ET AL   3,145,333
FORCE LIMITING DEVICE FOR MOTOR CONTROL
Filed Oct. 29, 1962   3 Sheets-Sheet 3

INVENTORS
John A. Pardini
Victor Hutter
BY
Roland G. Anderson
Attorney

United States Patent Office 3,145,333
Patented Aug. 18, 1964

3,145,333
FORCE LIMITING DEVICE FOR MOTOR CONTROL
John Anthony Pardini, Brookfield, and Victor Hutter, Chicago, Ill., assignors to the United States of America as represented by the United States Atomic Energy Commission
Filed Oct. 29, 1962, Ser. No. 233,986
2 Claims. (Cl. 318—475)

This invention relates to a manipulating device that is prevented from transmitting force beyond a certain value to an object being manipulated, for preventing injury to the object or the device. More specifically, the net force being transmitted by the device is controlled so as not to exceed a predetermined value.

It is known to employ a force limiter in conjunction with a manipulator, but such a limiter operates as to the total force transmitted. Thus as the background force such as that of friction varies, the net force capable of being transmitted varies, and, in effect, there is really no effective limiting of a force transmitted to a certain value.

We have invented a force limiter that can be adjusted so as to operate at a fixed net force independently of varying background forces.

Figure 1:
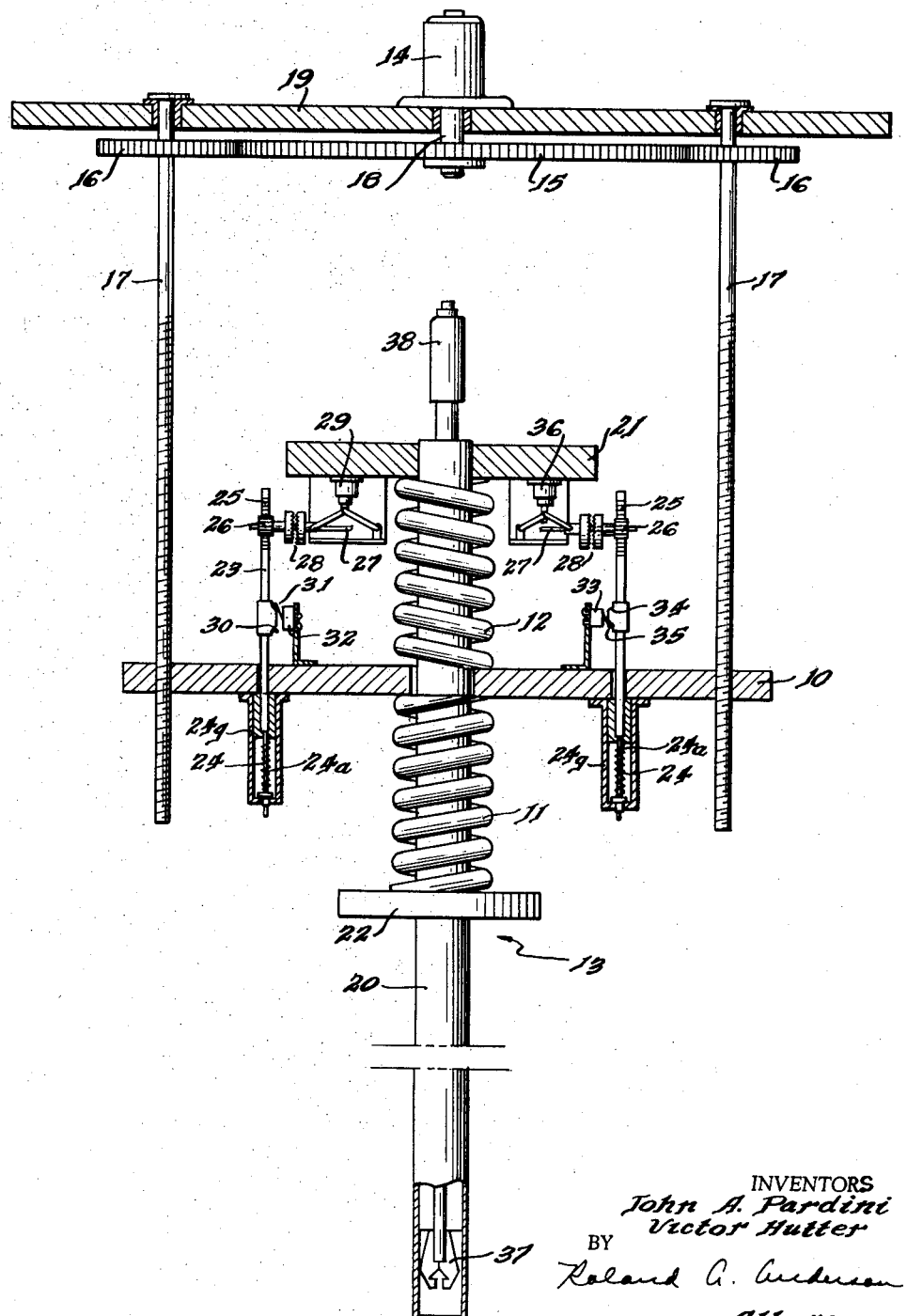
FIG. 1 is a sectional view, partially schematic, of the force limiter of the present invention.

As shown in FIG. 1, a driving member 10 acts through opposed heavy coil springs 11 and 12 to move a driven member 13. Force to move the driving member 10 is transmitted from a motor 14 through a gear 15, pinions 16 and screws 17. The gear 15 is attached to a shaft 18 of the motor 14 and meshes with the pinions 16. The screws 17 are secured to the pinions 16 for rotation therewith and engage threaded openings in the driving member 10 so that rotation of the screws makes the driving member move lengthwise of the screws. The screws 17 are carried by a support 19, in which they are journaled for rotation and held against axial movement. The support 19 also carries the motor 14.

The driven member 13 comprises a tubular housing 20, a plate 21, and a collar 22, the plate and collar being secured to the tubular housing as by welding. The tubular housing 20 passes freely through an opening in the driving member 10 and lies within the springs 11 and 12, the outer ends of which act against the collar 22 and the plate 21, respectively. The inner ends of the springs 11 and 12 act against the driving member 10.

Figure 2:
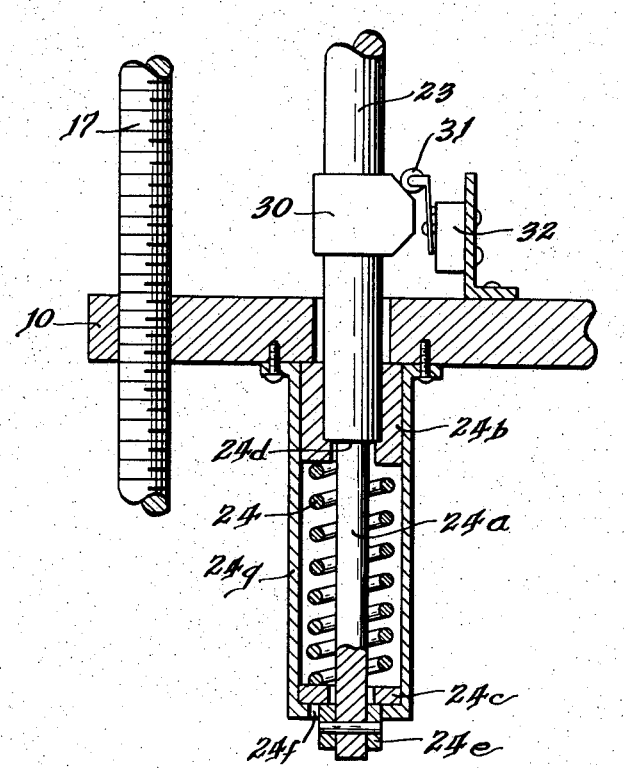
FIG. 2 is a fragmentary sectional view of the portion of the force limiter.

The driving member 10 carries a rod 23 which passes with appreciable clearance through an opening in the driving member. As shown in FIG. 2, a coil spring 24, which surrounds a reduced portion 24a on the lower end of the rod 23, has its upper end in abutment with the lower end of a relatively short sleeve 24b and its lower end in abutment with a ring 24c. The sleeve 24b is internally flanged at one end so as to abut a shoulder 24d on the rod 23. The ring 24c abuts a collar 24e pinned to the portion 24a of rod 23 and also an internal flange 24f on the lower end of a relatively long sleeve 24g secured at its upper end to the driving member 10. The spring 24 urges the upper end of the sleeve 24b into abutment with the driving member 10.

The rod 23 has formed thereon a gear rack 25, which meshes with a pinion 26, which is rotatably mounted on a non-rotatable shaft 27, but is fixable thereto by a brake 28 controlled by a solenoid 29. The solenoid and the shaft 27 are carried by the plate 21 of the driven member 13. The rod 23 carries a cam 30 engaged by a follower 31 controlling a limit switch 32.

When the pinion 26 is freely rotatable because of disengagement of the brake 28, the pinion is without effect on the rod 23, and the rod moves with the driving member 10. There is no effect on the switch 32. When the pinion 26 is made nonrotatable by engagement of the brake 28, the rod 23 is fixed against movement with respect to the plate 21 of the driven member 13. If the driving member 10 moves downward sufficiently with respect to the driven member 13, the driving member also moves with respect to the rod 23, causing the follower 31 to ride upon a different portion of the cam 30, with the result that the switch 32 opens.

The present apparatus is provided with another set of rod 23, spring 24, gear rack 25, pinion 26, and brake 28 similar to those just described. With this new set, however, a limit switch 33 or the driving member 10 is opened when there is sufficient upward movement, rather than downward movement, of the driving member 10 with respect to the driven member 13. This is due to a different arrangement of a cam 34 on the second rod 23 and a follower 35 engaging cam 34 and controlling switch 33. The second brake 28 is controlled by a solenoid 36.

The driving and driven members 10 and 13 of the present apparatus are illustrated for use in positioning a tool 37 for manipulating fuel elements in a nuclear reactor. The tool 37, which lies within the tubular housing 20 of the driven member 13 and is actuated by a motor 38, will project from the lower end of the tubular housing when engaging a fuel element in order to move it into or out of a nuclear reactor. It is important that the force transmitted through the tool 37 not be excessive for fear of damage to the tool or the fuel element.

Figure 3:
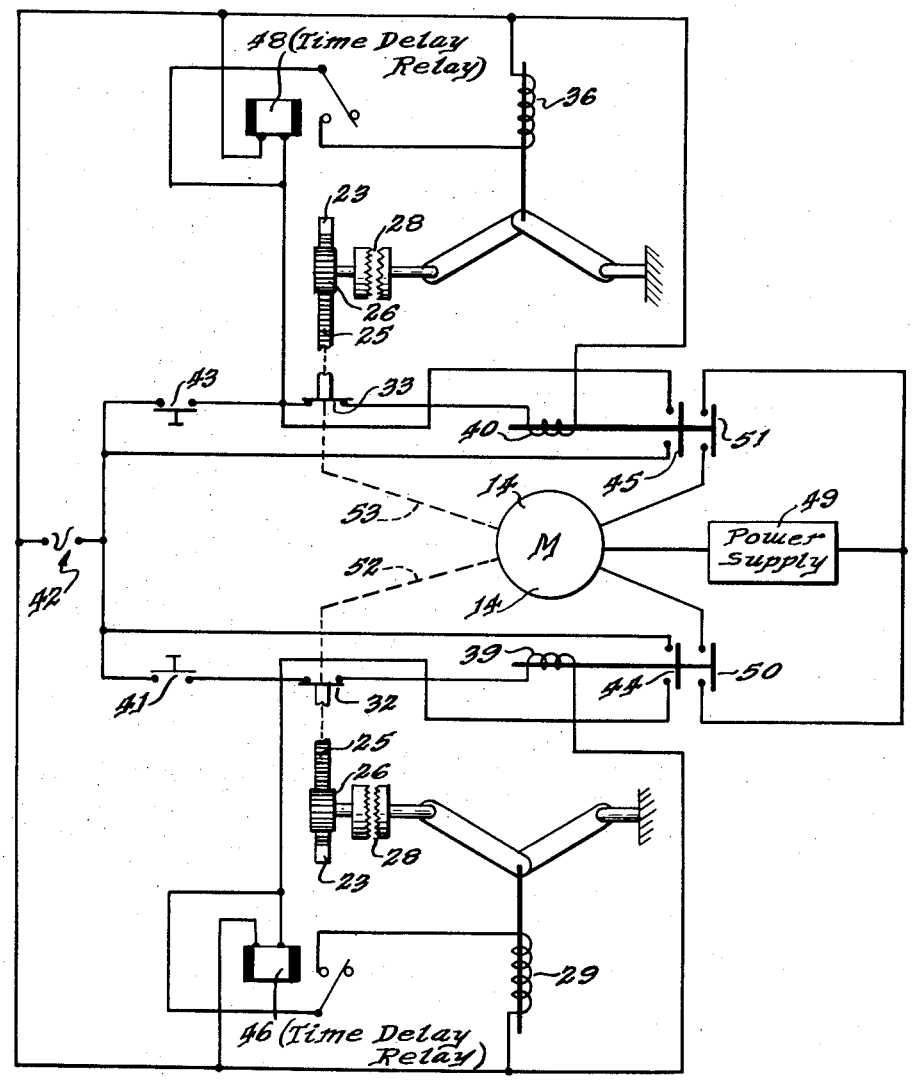
FIG. 3 is a diagram of the electric circuit employed with the force limiter.

As shown in FIG. 3, the motor 14 is rotated in one direction when a relay coil 39 is energized, and in the opposite direction when a relay coil 40 is energized. In either event, the motor is connected with an electrical power source 49 through switches 50 and 51, switch 50 closed by relay 39 and switch 51 closed by relay 40. Coil 39 is energized when a switch 41 is manually closed, for then current flows from an electrical source 42 through the switch 41 and the switch 32, normally closed, to the relay coil 39. Coil 40 is energized when a switch 43 is manually closed, for then current flows from the electrical source 42 through the switch 43 and the switch 33, normally closed, to the relay coil 40. Switches 41 and 43 are arranged or interconnected in a manner (not shown) that one switch cannot be closed while the other is closed. Coil 39 or 40 remains energized upon switch 41 or 43 being manually released by their respective holding circuits through switch 44 or 45.

Closing of switch 41 energizes a time-delay relay 46, which after a predetermined time, closes a circuit to send current through the solenoid 29. As described above, the energization of solenoid 29 engages brake 28 which permits switch 32 to be opened by rod 23, gear rack 25 and pinion 26 upon a sufficient relative movement of the driving member 10 with respect to the plate 21 of the driven member 13 as represented by connection 52 shown as a dotted line. Opening of switch 32 deenergizes relay coil 39, opening switch 50 and thereby stopping the motor 14. Further, opening switch 32 and deenergizing relay coil 39 opens switch 44 and deenergizes time delay relay 46 and the solenoid 29, disengaging the brake 28 and unlocking the pinion 26. As a result, the rod 23 can return, under action of spring 24 and associated parts, to a normal position in which the cam 30 is so positioned with respect to the follower 31 that the switch 32 is again closed.

Closing of switch 43 energizes a time-delay relay 48, which, after a predetermined time, closes a circuit to send current through the solenoid 36. As described above, the energization of solenoid 36 engages brake 28 which permits switch 33 to be opened by rod 23, gear rack 25 and pinion 26 upon a sufficient relative movement of the driving member 10 with respect to the plate 21 of the driven member 13 as represented by connection 53 shown as a dotted line. The operation of switches 45 and 51 and relays 40, 36 and 48 after switch 33 opens is the same as described above for switch 32.

When the apparatus of the present invention is used for the manipulation of fuel elements in a nuclear reactor, the tubular housing 20 may extend through a tightly fitting seal in the cover of the nuclear reactor. The friction between the tubular housing 20 and the sealed opening may be considerable and vary appreciably under different conditions of operation. Yet the housing 20 and the associated tool 37 will be moved with the same net force with respect to whatever is to be manipulated, because the present apparatus compensates for background forces such as friction. When the tubular housing 20 is inserted in the nuclear-reactor cover, it is lowered by the motor 14 acting through the driving member 10, the spring 11, and the collar 22. Depending upon the friction exerted by the cover against the housing 20, the spring 11 is deflected a greater or lesser amount. When the motor 14 first moves the driving member 10, the rod 23, under action of spring 24, moves with the driving member, since the time-delay relay 46 has not yet energized the solenoid 29 to make the clutch lock the rod 23 to the plate 21 by holding the pinion 26 against rotation. Thus this initial deflection of the spring 11 before locking of the rod 23 to the plate 21 is a measure of the background force such as friction, variable as it may be. After the predetermined time has elapsed for the time-delay relay to lock the rod 23 to plate 21, additional deflection of the spring 11 will involve not only movement of the plate 21 with respect to the driving member 10, but also movement of the locked rod 23 with respect to the driving member. Such additional deflection must, of course, be expected as the housing 20 and the tool 37 encounter fuel elements. Yet the additional deflection will not exceed a certain amount, for otherwise there will result a movement of the rod 23 with respect to the driving member 10 sufficient to make the follower 31 moved by the cam 30 enough to open the switch 30, whereupon the motor 14 is stopped.

It is possible to lower the housing 20 and tool 37 to the fuel elements on the reactor in two stages or steps, because the background force of friction may change appreciably during the movement. Thus, at the start of movement the friction may be relatively high; the apparatus is set for a background of high friction and is protected against unseen obstacles that may lie in the path of the housing 20 and tool 37 on the way to the fuel elements. Then when the housing 20 and tool 37 reach the vicinity of the fuel elements, the switch 32 is opened to stop the motor 14 and deenergize the solenoid 29, with the result that the brake 28 releases the pinion 26 and the spring 24 returns the rod 23 to its normal position. Now the switch 32 is closed anew, and in the interval before the solenoid 29 is energized to fix the pinion 26, the spring 11 is compressed an amount that is perhaps different from the original amount and is a measure of the background force of friction now in existence, which may be different from the original friction.

When the tool 37 has engaged a fuel element and is to move it upward in the reactor, the switch 43 is closed, causing the motor 14 to move the driving member 10 upward, compressing the spring 12. After a certain time the solenoid 36 is energized to make the associated pinion 26 nonrotatable and lock the associated rod 23 to the plate 21 of the driven member. If excessive resistances are encountered by the fuel element during its upward movement, the spring 12 compresses sufficiently to move the cam 34 upward on the follower 35 to the point of opening the switch 33. The result is that the motor 14 is stopped.

It is also understood that the invention is not to be limited by the details given herein but that it may be modified within the scope of the appended claims.

What is claimed is:
1. A drive system comprising
 (I) a driving member;
 (II) a driven member;
 (III) spring means yieldingly transmitting motion of said driving member to said driven member;
 (IV) a motor operatively connected with said driving member for moving the same; and
 (V) means for causing the motor to stop moving said driving member in the event of excessive movement of said driving member with respect to said driven member, said last mentioned means comprising first and second relatively movable cooperating parts mounted on said driving member, means fixedly securing the first part to said driving member, means releasably securing the second part to said driven member, time delayed electromagnetic means to actuate said releasable means a predetermined time after initiation of motor operation, whereby energization of said electromagnetic means causes said second part to be secured to said driven member and said excessive movement of the members causes relative movement of said first and second parts, switch means responsive to said relative movement to stop said motor.

2. A drive system comprising
 (I) a driving member;
 (II) a driven member;
 (III) opposed springs applied between said members to enable said driving member to move said driven member in one direction and in the opposite direction;
 (IV) a motor operatively connected with said driving member for moving the same; and
 (V) two separate means, one for causing the motor to stop moving said driving member in the said one direction in the event of excessive movement of said driving member with respect to said driven member in the said one direction, the other of the last mentioned means for causing the motor to stop moving said driving member in the said opposite direction in the event of excessive movement of said driving member with respect to said driven member in the said opposite direction, each of the last mentioned means comprising first and second relatively movable cooperating parts mounted on said driving member, means fixedly securing the first part to said driving member, means releasably securing the second part to said driven member, time delayed electromagnetic means to actuate said releasable means a predetermined time after initiation of motor operation, whereby energization of said electromagnetic means causes said second part to be secured to said driven member and said excessive movement of the members causes relative movement of said first and second parts, switch means responsive to said relative movement to stop said motor.

References Cited in the file of this patent

UNITED STATES PATENTS

| | | |
|---|---|---|
| 2,387,047 | Weiss | Oct. 16, 1945 |
| 2,420,855 | Bogart | May 20, 1947 |
| 2,846,633 | Gingrich | Aug. 5, 1958 |